United States Patent
Sabbatini

(10) Patent No.: US 12,017,651 B2
(45) Date of Patent: Jun. 25, 2024

(54) CONTROL OF A VEHICLE TRACTION MOTOR TORQUE WHILE VEHICLE ROLL-BACK IS INHIBITED

(71) Applicant: JAGUAR LAND ROVER LIMITED, Coventry (GB)

(72) Inventor: Alessio Sabbatini, Warwickshire (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 900 days.

(21) Appl. No.: 16/971,619

(22) PCT Filed: Feb. 25, 2019

(86) PCT No.: PCT/EP2019/054514
§ 371 (c)(1),
(2) Date: Aug. 20, 2020

(87) PCT Pub. No.: WO2019/162480
PCT Pub. Date: Aug. 29, 2019

(65) Prior Publication Data
US 2020/0398843 A1     Dec. 24, 2020

(30) Foreign Application Priority Data
Feb. 26, 2018 (GB) .................................... 1803044

(51) Int. Cl.
*B60T 7/12*     (2006.01)
*B60W 10/08*     (2006.01)
(Continued)

(52) U.S. Cl.
CPC ....... *B60W 30/18027* (2013.01); *B60T 7/122* (2013.01); *B60W 10/08* (2013.01);
(Continued)

(58) Field of Classification Search
CPC ...... B60T 7/122; B60T 8/245; B60T 2201/06; B60W 30/18027; B60W 30/18118;
(Continued)

(56) References Cited

U.S. PATENT DOCUMENTS 9,018,878 B2 * 4/2015 Hendrickson ......... B60L 15/007
                                                  318/471
2005/0211478 A1   9/2005 Sakuma et al.
(Continued)

FOREIGN PATENT DOCUMENTS

EP         1621438 A2    2/2006
FR         2882699 A1    9/2006
(Continued)

OTHER PUBLICATIONS

International Search Report and Written Opinion, PCT/EP2019/054514, dated Jul. 12, 2019.
(Continued)

*Primary Examiner* — Thomas J Williams
(74) *Attorney, Agent, or Firm* — McCoy Russell LLP

(57) ABSTRACT

A controller (104) and method for controlling torque generated by at least one traction motor (116a, 116b) of a vehicle (100) before a vehicle launch, comprising: means to determine that the vehicle is on a positive gradient; means to determine that the vehicle is prevented from roll-back by at least one vehicle brake (111); means to, in dependence on the determining that the vehicle is on a positive gradient and is prevented from roll-back, limit torque generation 10 by the traction motor in response to torque demand; and means to remove the limit when a vehicle launch condition is satisfied.

20 Claims, 2 Drawing Sheets

(51) Int. Cl.
  *B60W 10/18* (2012.01)
  *B60W 30/18* (2012.01)
(52) U.S. Cl.
  CPC ...... *B60W 10/18* (2013.01); *B60W 30/18118* (2013.01); *B60T 2201/06* (2013.01); *B60W 2552/15* (2020.02); *B60W 2710/085* (2013.01)
(58) Field of Classification Search
  CPC ........... B60W 30/184; B60W 30/1843; B60W 10/08; B60W 10/18; B60W 2552/15; B60W 2710/085; B60L 15/2018; B60L 15/2027; B60L 15/2063
  See application file for complete search history.

(56) References Cited

U.S. PATENT DOCUMENTS

| | | | | |
|---|---|---|---|---|
| 2009/0093337 | A1* | 4/2009 | Soliman | B60W 10/06 903/946 |
| 2009/0107740 | A1* | 4/2009 | Bell | B60L 15/2018 701/22 |
| 2010/0076637 | A1 | 3/2010 | Yeoka | |
| 2010/0121515 | A1* | 5/2010 | Izumi | B60W 10/184 701/22 |
| 2010/0198449 | A1 | 8/2010 | Ueoka et al. | |
| 2013/0060409 | A1* | 3/2013 | Matsushita | B60W 10/184 180/65.23 |
| 2013/0197733 | A1* | 8/2013 | Zeng | B60W 30/18118 701/22 |
| 2013/0296112 | A1* | 11/2013 | Yamazaki | B60W 10/06 903/902 |
| 2016/0185254 | A1 | 6/2016 | Ariyoshi et al. | |
| 2016/0214595 | A1* | 7/2016 | Baehrle-Miller | B60T 7/22 |
| 2017/0232969 | A1* | 8/2017 | Hunt | B60T 8/17 477/93 |
| 2020/0398843 | A1* | 12/2020 | Sabbatini | B60W 30/18118 |
| 2021/0078577 | A1* | 3/2021 | Roques | B60L 50/60 |

FOREIGN PATENT DOCUMENTS

| | | |
|---|---|---|
| GB | 2454270 A | 5/2009 |
| GB | 2551822 A | 1/2018 |
| JP | H0937415 A | 2/1997 |
| JP | 3816300 B | 11/2001 |
| JP | 2006101646 A | 4/2006 |

OTHER PUBLICATIONS

Combined Search and Examination Report, GB1803044.5, dated Aug. 13, 2018.

* cited by examiner

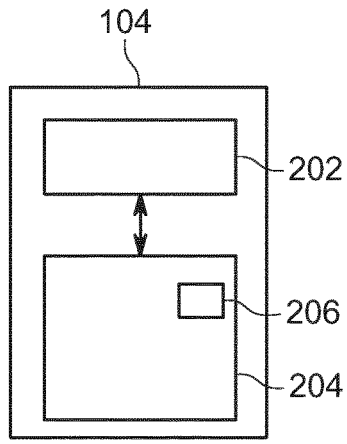
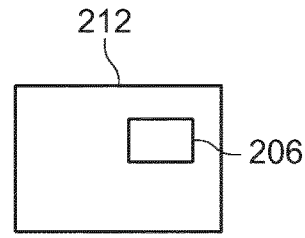
FIG. 2A    FIG. 2B
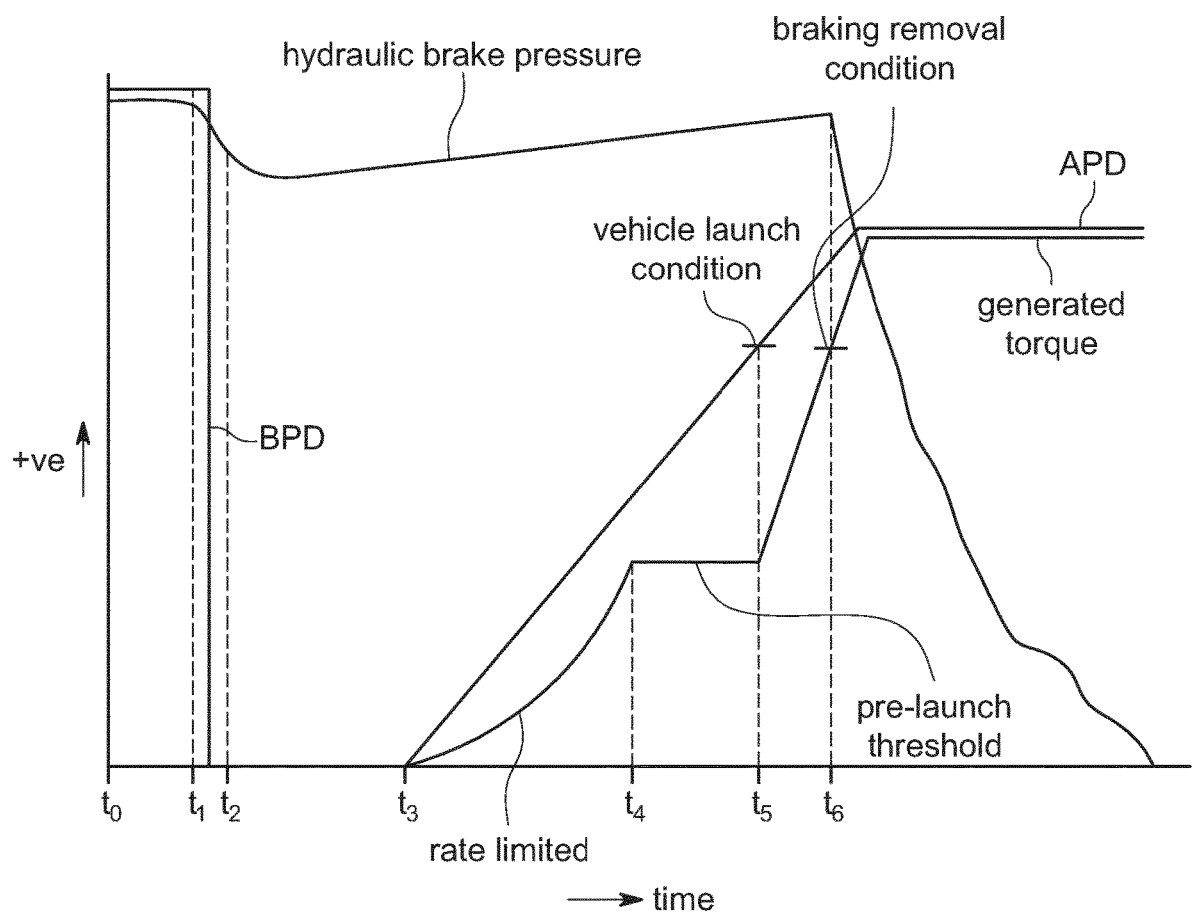
FIG. 3

CONTROL OF A VEHICLE TRACTION MOTOR TORQUE WHILE VEHICLE ROLL-BACK IS INHIBITED

CROSS-REFERENCE TO RELATED APPLICATIONS

This application is a 371 of International Application No. PCT/EP2019/054514, filed Feb. 25, 2019, which claims priority to GB Patent Application 1803044.5, filed Feb. 26, 2018, the contents of both of which are incorporated by reference herein in their entirety.

TECHNICAL FIELD

The present disclosure relates to control of vehicle traction motor torque while vehicle roll-back is inhibited. In particular, but not exclusively it relates to control of vehicle traction motor torque while vehicle roll-back is inhibited in vehicles or axles where the propulsion is delivered by an electric machine, such as electric-only and hybrid vehicles.

Aspects of the invention relate to a controller, a system, a vehicle, a method and a computer program.

BACKGROUND

It is known for a vehicle to have a hill-hold function that automatically applies a brake of the vehicle to hold the vehicle on a gradient and prevent roll-back, until enough accelerator pedal demand (APD) is requested by the driver to launch the vehicle without roll-back, at which point the brakes release automatically.

In a hybrid or electric-only vehicle, the electric motor ('traction motor' or 'electric machine' herein) can produce torque at 0 rpm—'stall torque'. The traction motor can overheat if it is stalled excessively before launch.

It is an aim of the present invention to address disadvantages associated with the prior art.

SUMMARY OF THE INVENTION

Aspects and embodiments of the invention provide a controller, a system, a vehicle, a method and a computer program as claimed in the appended claims.

According to a further aspect of the invention there is provided a controller for controlling torque generated by at least one traction motor of a vehicle before a vehicle launch, comprising:

means to determine that the vehicle is on a positive gradient;

means to determine that the vehicle is prevented from roll-back by at least one vehicle brake;

means to, in dependence on the determining that the vehicle is on a positive gradient and is prevented from roll-back, limit torque generation by the traction motor in response to torque demand; and means to remove the limit when a vehicle launch condition is satisfied.

This provides the advantage of protecting the traction motor and/or associated power electronics (such as inverters) from overheating during hill-hold. Permanent magnet motors can be particularly susceptible to overheating as compared to other traction motors such as induction motors.

The torque demand may be from the driver, for example in the form of APD. Alternatively, the torque demand may be applied automatically by a semi-autonomous driving function.

The limit may not be applied if the determination is that the vehicle is not prevented from roll-back, for example if the vehicle is reliant on torque from the traction motor for holding itself stationary.

In some examples, the controller is configured such that the torque generation is limited before an entry condition for a thermal de-rate function that de-rates the traction motor and/or an entry condition for a thermal de-rate function that de-rates an inverter for the traction motor above a threshold temperature is satisfied. This provides the advantage of preventative, rather than reactive overheating protection.

In some examples, the limit restricts a rate of increase of torque generation by the traction motor in response to an increase of torque demand. This provides the advantage of a smoother response and reduced noise, vibration and harshness (NVH). In some examples, the limit inhibits an amount of torque generation by the traction motor from exceeding a pre-launch threshold. This provides the advantage of a protective thermal limit on stall torque. In some examples, the limit restricts the rate of increase up to the pre-launch threshold.

In some examples, the pre-launch threshold depends on at least one of: a gradient that the vehicle is on; a driving mode that is currently active; whether the vehicle is towing; a user setting; a parameter detected by a sensor; an elapsed time period. In some examples, the parameter is related to the temperature of the traction motor and/or power electronics for the traction motor. This provides the advantage that the response lag for meeting torque demand upon removal of the limit can be reduced when the vehicle is launching uphill, off-roading, towing, or in similar driving scenarios.

In some examples, the pre-launch threshold is configured to be low enough such that thermal de-rating of the traction motor does not activate while the generated torque is at the pre-launch threshold for at least a predetermined length of time. This provides the advantage of preventing overheating for at least the typical time hill-hold functions are needed for—a few seconds or at most, minutes. In some examples, the pre-launch threshold is configured to be high enough such that the powertrain and/or drivetrain is pre-loaded while the generated torque is at the pre-launch threshold. This provides the advantage of avoiding thump when the torque later increases, by removing slack and applying twist to the drivetrain. In some examples, the pre-launch threshold is a value equivalent to a percentage of the maximum powertrain torque capability. The optimum value depends on various factors such as the heat rejection capacity of the traction motor and associated power electronics, and may fall as an example within the range of about 10% to about 70% of the maximum powertrain torque capability.

In some examples, the controller is configured to apply the limit while a hill-hold function is active, that applies automatic braking to hold the vehicle stationary without a need for continued manual brake pedal application. This provides the advantage that the limit is applied in a situation in which more stall torque may be required than normal for moving—the traction motor may need to act against the brakes for at least some time before the brakes are fully off.

In some examples, the hill-hold function is active if an entry condition is satisfied, the entry condition being satisfied if at least one of the following requirements is met: the vehicle is on a positive gradient above a positive gradient threshold; the vehicle speed is below a threshold; a brake pedal of the vehicle is initially manually applied. The positive gradient may be as determined above, or determined separately by a separate controller. Initial manual braking ensures the automatic braking is not unexpected.

In some examples, the hill-hold function is configured to commence removing the automatic braking when a braking removal condition is satisfied at least by torque generated by at least the traction motor following removal of the limit, or torque demand, being equal to or more than an estimated torque required for holding the vehicle stationary and/or for vehicle launch. In some examples, the braking removal condition is satisfied by torque generated by at least the traction motor following removal of the limit, or torque demand, being a predetermined amount more than the estimated torque required for vehicle launch. The brake pressure may fall gradually. This provides the advantage that the brakes are only released when minimal or no roll-back will occur, even if there is a lag in traction motor torque meeting demand.

In some examples, the vehicle launch condition is configured to be satisfied before the braking removal condition is satisfied, as torque demand rises. In some examples, the vehicle launch condition is satisfied at least when torque demand has increased to a value from the range 70-90% of estimated torque required for holding the vehicle stationary and/or for vehicle launch. By allowing torque to rise to meet demand early, then releasing the brakes, this provides the advantage of minimal or no roll-back, even if there is a lag in traction motor torque meeting demand. Alternatively, the range may be 50%-150%, depending on how much roll-back should be allowed.

According to a further aspect of the invention there is provided a system comprising the controller and the at least one traction motor as described herein. In some examples, the at least one traction motor comprises a plurality of traction motors, wherein the limit is different for each of the traction motors. Alternatively, the limit may be the same for each of the traction motors.

According to a further aspect of the invention there is provided a controller comprising at least one electronic processor; and at least one electronic memory device electrically coupled to the electronic processor and having instructions (a computer program) stored therein, the at least one electronic memory device and the instructions configured to, with the at least one electronic processor, perform:
  determining that the vehicle is on a positive gradient;
  determining that the vehicle is prevented from roll-back by at least one vehicle brake;
  in dependence on the determining that the vehicle is on a positive gradient and is prevented from roll-back, implementing a limit of torque generation by the traction motor in response to torque demand; and
  removing the limit when a vehicle launch condition is satisfied.

The controller 'means' as described herein may equate to the at least one electronic processor; and at least one electronic memory device electrically coupled to the electronic processor and having instructions stored therein.

According to a further aspect of the invention there is provided a vehicle comprising the system as described herein.

According to a further aspect of the invention there is provided a method of controlling torque generated by at least one traction motor of a vehicle before a vehicle launch, the method comprising:
  determining that the vehicle is on a positive gradient;
  determining that the vehicle is prevented from roll-back by at least one vehicle brake;
  in dependence on the determining that the vehicle is on a positive gradient and is prevented from roll-back, implementing a limit of torque generation by the traction motor in response to torque demand; and
  removing the limit when a vehicle launch condition is satisfied.

According to a further aspect of the invention there is provided a computer program that, when run on at least one electronic processor, causes the electronic processor to cause controlling torque generated by at least one traction motor of a vehicle before a vehicle launch, comprising:
  determining that the vehicle is on a positive gradient;
  determining that the vehicle is prevented from roll-back by at least one vehicle brake;
  in dependence on the determining that the vehicle is on a positive gradient and is prevented from roll-back, implementing a limit of torque generation by the traction motor in response to torque demand; and
  removing the limit when a vehicle launch condition is satisfied.

According to a further aspect of the present invention there is provided a (non-transitory) computer readable medium comprising the computer program.

According to a further aspect of the invention there is provided a controller for controlling torque generated by at least one traction motor of a vehicle before a vehicle launch, comprising: means to determine that the vehicle is on a positive gradient; means to, in dependence on the determining that the vehicle is on a positive gradient, limit torque generation by the traction motor in response to torque demand while the vehicle is not rolling back; and means to remove the limit when a vehicle launch condition is satisfied. This relates to a situation in which it is not necessary that the vehicle is held from roll-back by a brake, and a traction motor and/or ICE applies hill-hold torque. This enables various other implementations. For example, if the vehicle has a plurality of traction motors, hill-hold torque generation could be shifted from one traction motor to the other whenever the temperature of each traction motor/inverter exceeds a threshold, lower than a threshold for a thermal de-rate function. In other words, the limit could be applied to different traction motors sequentially to prevent temperature from exceeding the threshold for the thermal de-rate function, while the non-limited traction motor holds the vehicle on the hill.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:
FIG. 2A illustrates an example of a controller;
FIG. 2B illustrates an example of a computer-readable storage medium;
and FIG. 3 illustrates an example of a hill-hold launch time history.

DETAILED DESCRIPTION

Figure 1A:
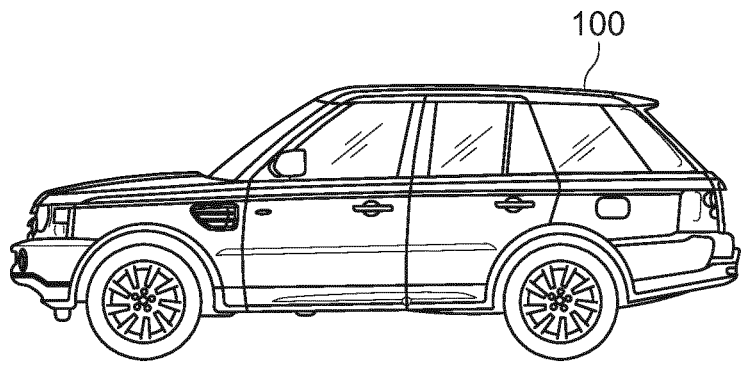
FIG. 1A illustrates an example of a vehicle.

FIG. 1A illustrates an example of a vehicle 100 in which embodiments of the invention can be implemented. In some, but not necessarily all examples, the vehicle 100 is a passenger vehicle, also referred to as a passenger car or as an automobile. Passenger vehicles generally have kerb weights of less than 5000 kg. In other examples, embodiments of the invention can be implemented for other applications, such as industrial vehicles, air or marine vehicles.

Figure 1B:
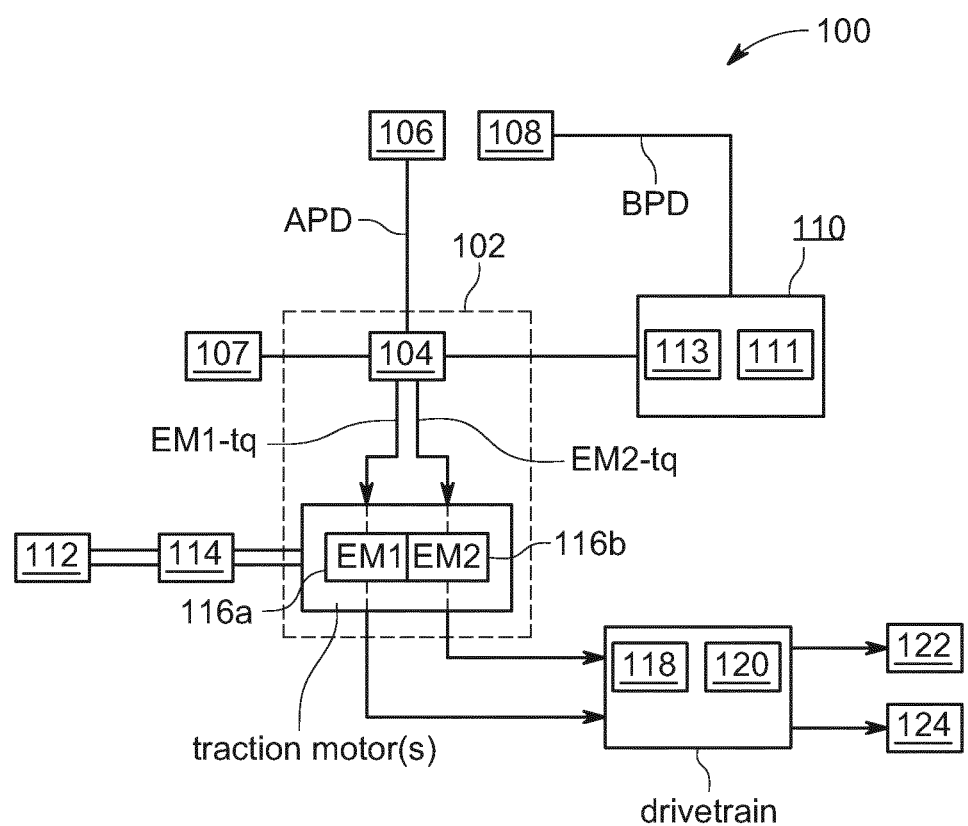
FIG. 1B illustrates an example of a system in a vehicle.

FIG. 1B shows an example of a system and various related subsystems for a vehicle such as the vehicle 100 of FIG. 1A.

The vehicle 100 of FIGS. 1A and 1B is an all-electric vehicle. Such vehicles do not comprise internal combustion engines (ICEs), and are only driven by at least one traction motor 116a, 116b supplied with electrical energy from a high-voltage (hundreds of volts) traction battery 112 via an inverter 114, as shown. In some examples, each traction motor has its own inverter. The traction motor may be a permanent magnet motor, which has been found to be more susceptible to overheating than induction motors, or may be an induction motor or any other type. FIG. 1B shows two traction motors EM1 116a and EM2 116b, although any number can be provided, for example one for each wheel. In other examples, the vehicle 100 may be a series hybrid electric vehicle, with a range-extending ICE. In still further examples, the vehicle 100 may be a parallel hybrid electric vehicle, wherein an ICE can provide at least some tractive torque.

If the vehicle 100 is capable of changing a torque multiplication between the traction motor 116a, 116b and the wheels, the vehicle 100 may comprise a transmission 118 and/or a transfer case 120. The transmission 118 may be any appropriate type of gearbox. The transfer case 120 would be downstream of the transmission 118, and may be capable of controlling front-rear axle torque split and/or whether the vehicle 100 is in a high 'H' or low 'L' range.

In one example, each of the two traction motors EM1 116a and EM2 116b is coupled to a separate axle 122, 124. EM1 is coupled to a front axle 122 and EM2 is coupled to a rear axle 124. In this example, a transfer case may not be required.

The vehicle 100 is capable of being driven manually, therefore the vehicle 100 comprises manual controls including an accelerator pedal 106, a brake pedal 108, and a steering wheel (not shown). In some examples, the vehicle 100 is semi-autonomous, such that acceleration and braking can be controlled automatically by an advanced driver assistance system (ADAS) (not shown) under driver supervision, when ADAS is active.

Other driver inputs may include one or more human-machine interfaces (HMI) such as switchgear and touchscreens (not shown) for enabling the driver to control infotainment, powertrain settings, driving mode settings, suspension settings, and other user settings for the vehicle 100. Driving modes include, for example: normal; rain/ice/snow; dynamic; rock crawl; grass/gravel/snow; mud/ruts/sand, etc. Each mode determines one or more different powertrain (engine map) and/or drivetrain (shift map, transfer case range, 2/4 wheel drive) and/or suspension (ride height, damping) and/or steering (weight, ratio) settings of the vehicle 100.

FIG. 1B also illustrates a controller 104 of at least the powertrain. The controller 104 and at least one traction motor 116a, 116b may together define a system 102. In some examples, the system 102 may include any one or more of the other components shown in FIG. 1B. The controller 104 may consist of a single discrete control unit such as shown in FIG. 2A and described below, or its functionality may be distributed over a plurality of such control units.

Various subsystems of FIG. 1 are operably coupled to the controller 104 via any appropriate means, for example via a communications bus (e.g. CAN bus).

The controller 104 is configured to receive an accelerator pedal demand (APD) signal from the accelerator pedal 106, e.g. from 0% to 100%, and convert the signal into a torque demand for the powertrain (e.g. PT_tq).

If the vehicle 100 is a parallel hybrid vehicle, PT_tq may be split into an ICE component (Eng_tq) and a traction motor component (EM_tq). The split may depend on a strategy implemented by an energy management system (not shown) and other systems. In an electric-only vehicle, PT_tq is EM_tq.

In the case of traction motors coupled to different wheels or axles, EM_tq may be further split into EM1_tq, EM2_tq such as shown in FIG. 1B. In an example, the split can control whether drive of the vehicle 100 is front-biased or rear-biased, and/or left-biased or right-biased. The torque generated by the traction motor(s) is generally proportional to APD when the vehicle is under manual control.

The conversions and splits as described above may also be influenced by one or more functions such as ADAS torque demand, traction control, stability control, four-wheel steering, electronic differential, energy management, etc.

The maximum torque of a traction motor is defined as the torque it produces when maximum torque demand is applied and held in normal operation. This corresponds at least to 100% APD. In an example, this corresponds to a particular steady-state root-mean-square stator current applied to the traction motor.

The vehicle 100 comprises a brake system 110 comprising at least one brake 111. The at least one brake 111 may comprise a friction brake for generating negative (braking) wheel torque. The friction brake 111 may be implemented as a disc brake or a drum brake. The at least one brake 111 may comprise a brake for each wheel of the vehicle 100.

Application of the brake 111 may be proportional to a brake pedal demand (BPD) signal from the brake pedal 108. In some examples, the BPD signal may be generated by a parking brake function which is actuated automatically by a function such as a hill-hold function to prevent roll-back, or manually by a button or lever or the like. Such a manual function is referred to as an electronic parking brake (EPB) function. In some, but not necessarily all examples, EPB's have dedicated brakes, and/or EPB torque demand is calculated slightly differently from regular braking torque.

In some examples, the brake system 110 may operate on hydraulic pressure. Hydraulic brake pressure can be modulated by a brake pressure modulator pump, for example. In an example, the BPD signal is converted to a required hydraulic brake pressure which corresponds to a required braking torque. The pump causes that pressure to be applied. Alternatively, actuation of the at least one brake 111 may be mechanical, electrical or pneumatic.

The distribution of braking torque by each wheel may be influenced by an anti-lock braking system (ABS) 113.

In FIG. 1B, the BPD signal is first received by the brake system 110 and the brake system 110 is able to communicate information about braking to the controller 104. Alternatively, the controller 104 may first receive BPD and control the functions of the brake system 110.

FIG. 1B also shows sensing means 107 for sensing one or more other variables to enable the controller 104 to perform one or more functions described herein. Any of the sensors described herein may form part of the sensing means 107.

If the vehicle 100 is drive-by-wire, one or more of the above-described signals and demands may be expressed as electronic signals.

A control unit is shown in FIG. 2A which may implement, at least in part, the functionality of the controller 104. The controller 104 comprises means to cause any one or more of the methods described herein to be performed.

The controller 104 includes at least one electronic processor 202; and at least one electronic memory device 204 electrically coupled to the electronic processor 202 and having instructions 206 (e.g. a computer program) stored therein, the at least one electronic memory device 204 and the instructions 206 configured to, with the at least one electronic processor 202, cause any one or more of the methods described herein to be performed.

FIG. 2B illustrates an example of a non-transitory computer-readable storage medium 212 comprising the computer program 206.

A hill hold function will now be described with reference to a hill hold time history shown in FIG. 3. The hill hold function may be implemented in instructions readable by a controller, such as the instructions 206. The time history is a graph showing multiple variables over time during implementation of the hill hold function: BPD; hydraulic brake pressure; APD; and generated torque by the traction motor 116a, 116b.

At time t0 the vehicle 100 drives on to a positive gradient. A positive gradient is defined as an uphill gradient in the direction in which the vehicle 100 is configured to travel: uphill ahead of the vehicle 100 if the transmission 118 is in a forward gear; and uphill behind the vehicle 100 if the transmission 118 is in reverse. If the vehicle does not have a conventional gearbox, forward and reverse are at least defined as a user-selected direction of travel via HMI.

At time t1 the driver applies braking to manually hold the vehicle 100 from roll-back by the at least one brake. This is represented in FIG. 3 by the presence of BPD, for example at 25%. If the vehicle 100 is semi-autonomous, the braking could be automatically applied by ADAS, if active. Examples of ADAS systems include adaptive cruise control, and All Terrain Progress Control (ATPC) which automatically controls brake and throttle for climbing or driving through obstacles.

At time t2 implementation of the hill-hold function begins. One or more entry requirements for entering the hill-hold function have been satisfied. Checking entry requirements and entering the hill-hold function may be the responsibility of any suitable control unit.

A first entry requirement is that a determination is made that the vehicle 100 is on a positive gradient of the road. In some examples, the first entry requirement may be satisfied if the positive gradient is above a threshold such as 1%. In an example implementation, the gradient may be determined using a model of the vehicle 100 that determines the forces acting on the vehicle 100. The model may be used for various purposes such as determining the total resistance to motion of the vehicle 100. The model accounts for various factors such as the weight of the vehicle 100, net wheel torque at a/each wheel of the vehicle 100 compared to what it should be for a given traction motor torque, gearing and braking force, and deduces that the vehicle 100 must be on a gradient when there is a discrepancy. A map such as a look-up table could be used to determine the specific gradient within a degree of precision, such as within a few degrees/percent. The model may utilize sensor information for this purpose, for example from a multiple-axis accelerometer (see FIG. 1B, 107). Alternatively, the gradient could be directly estimated from an inclinometer or equivalent sensor, or any other appropriate means.

Another entry requirement is that the vehicle 100 is prevented from roll-back by at least one vehicle brake. In some examples, the requirement may further specify that the brake pedal has to be initially manually depressed. For example, with reference to FIG. 3, the vehicle 100 must be first brought to a halt as a result of BPD.

Another optional entry requirement is that the transmission 118 of the vehicle 100 is not in neutral or park, and optionally not in reverse if reverse launches are prohibited. Further entry requirements may be defined which are outside the scope of this disclosure.

In some examples, the hill-hold function is available in any of the above-mentioned driving modes. Therefore, hill-hold can be simple to use, requiring fewer actions such as setting a driving mode, and may be usable in off-road modes such as rock crawl, in which high launch torque may be required on steep gradients. In other examples, selection of a particular driving mode (e.g. via HMI or a terrain sensor [imaging sensor]) is another entry requirement.

If the entry requirements are satisfied, the hill-hold function begins its implementation at t2 by applying automatic braking to hold the vehicle 100 stationary without a need for continued manual brake pedal application. For example, in the case of a hydraulic brake system, the brake system runs the brake pressure modulator pump (not shown) to maintain sufficient hydraulic brake pressure to keep the vehicle 100 from roll-back. Additionally or alternatively, the brake system could request the EPB to be applied, if installed. The level of required brake pressure may be adjusted in response to detection of roll-back and/or pre-calculated with reference to the gradient which the vehicle 100 is on, estimated using the techniques disclosed above.

At time t3 APD becomes a positive non-zero value as the driver begins to prepare to accelerate the vehicle 100 again. At this time, the brakes are still automatically applied by the hill-hold function.

The controller 104 limits torque generation by the traction motor 116a, 116b (e.g. EM1) in response to torque demanded of the traction motor 116a, 116b. One or more requirements for implementing the limit matches one or more of the requirements for entering the hill-hold function. This ensures that the limit is applied in hill-hold scenarios but not in other scenarios. In a particular example, implementation of the limit requires a/the determination that the vehicle 100 is on a positive gradient (optionally above a/the gradient threshold), and a/the determination that the vehicle 100 is (manually or automatically) prevented from roll-back by at least one vehicle brake. In some examples, one or more requirements for implementing the limit may be that the hill-hold function is active.

In some examples, one or more requirements for implementing the limit may be a temporal requirement. The temporal requirement may be satisfied if a temporal parameter associated with torque demand is below a threshold. For example, the temporal parameter may be a rate of change of torque demand (e.g. APD). This enables the controller 104 to distinguish between a situation in which the driver applies APD at a slow rate where excess heat would be generated before launch, and a situation in which a sufficiently fast APD application takes place that the vehicle is expected to be launched before the limit becomes necessary or beneficial.

The torque demanded of the traction motor 116a, 116b may be dependent on APD. In one example, the torque demanded of the traction motor 116a is EM1_tq. The limit may mean that the torque demand cannot be satisfied. Or, if the vehicle 100 is a parallel hybrid vehicle, the limit could be such that the proportion of torque generated by the ICE relative to the traction motor 116a, 116b is increased, so that APD is satisfied but with less contribution from the traction motor 116a, 116b.

In some, but not necessarily all examples, the limit may restrict a rate of increase of torque generation by the traction motor 116a, 116b in response to an increase of torque demand. In some, but not necessarily all examples, the limit may prevent an amount of torque generation by the electric motor from exceeding a pre-launch threshold. Or, as shown in FIG. 3, the limit may restrict the rate of increase up to the pre-launch threshold. The limit may apply for all torque demands (0-100%) as shown in FIG. 3, or to a sub-range thereof such as 10-100%.

In FIG. 3, the rate of increase is limited from time t3 until time t4 when the generated torque reaches a pre-launch threshold at time t4. The rate of increase is limited to a lower, positive rate, than a normal rate that would occur when the vehicle is not on a gradient and/or is not held from roll-back by its brakes. For example, the rate of increase may be limited to a lower, positive rate, than the rate of increase of APD or the torque demanded specifically of the traction motor (e.g. EM1_tq). The lower rate of increase has a benefit of improving NVH, for example by reducing powertrain oscillation on its mounts and torque shock effects. Another benefit is allowing a higher net rate of heat rejection from the traction motor 116a, 116b/inverter 114. The rate limitation may be shaped to reduce NVH during a lost motion phase of the powertrain and/or drivetrain as generated torque transitions from zero (or negative) to a positive value. In one example, the shaping could be such that the rate at which torque increases is low for low generated torque, and higher as generated torque increases. Alternatively or additionally to limiting the rate increase or implementing the pre-launch threshold, the proportionality between generated torque and APD may be controllable so that less-than-normal torque is generated by the traction motor 116a, 116b for a given APD, if the limit is applied.

The pre-launch threshold is a limit on generated torque by the traction motor 116a, 116b. The generated torque may be controlled to prevent it from exceeding the pre-launch threshold. In some examples, the pre-launch threshold may be set as a target that replaces the APB-based torque demand when the pre-launch threshold is exceeded, so that the generated torque drops back down to the pre-launch threshold after an overshoot.

The pre-launch threshold is configured to be low enough such that thermal de-rating of the traction motor 116a, 116b does not activate while the generated torque is at the pre-launch threshold for at least a predetermined length of time. The predetermined length of time may be for at least the typical time hill-hold functions are needed for—a few seconds or at most, minutes. However, the predetermined time could be longer in the order of hours or indefinite. The specific value of the pre-launch threshold depends on implementation because different traction motors/inverters have different heat rejection rates. It is expected that the pre-launch threshold would be no higher than about 70% in practice for a well-cooled traction motor. In an example, the value is within the range of about 10% to about 70% of the maximum powertrain torque capacity. More precisely, maximum torque capacity can be that which is normally achievable at 100% APD.

Since the entry condition(s) for implementing the limit are satisfied before the torque generated by the traction motor 116a, 116b exceeds the pre-launch threshold, the vehicle 100 is pre-emptively controlled to avoid overheating. It can be said that the controller 104 is configured such that the torque generation is limited before the entry condition for the thermal de-rate function is satisfied. This makes it less likely for the thermal de-rate function to be entered during the hill-hold event.

In some examples, the pre-launch threshold should not be too low either. The pre-launch threshold is configured to be high enough such that the powertrain and/or drivetrain is pre-loaded while the generated torque is at the pre-launch threshold. The pre-load may remove any lost motion and create some twist of the drivetrain. Consequently, a thump will not be perceived on vehicle launch. The pre-launch threshold may even be high enough to enable perceptible vehicle squat that feels proportional to torque demand, until the pre-launch threshold is reached. A lowest value of the pre-launch threshold depends on implementation but is expected to be no higher than about 5% in practice for larger traction motors and no higher than about 10% in practice for smaller traction motor.

The pre-launch threshold may be factory predetermined or may be variable in dependence on one or more parameters. The lower the threshold, the longer the duration of the lag time for meeting torque demand when the limit is removed. This lag may be unacceptable in some situations, including but not limited to:

The vehicle 100 is to launch against a high gradient. For example, the pre-launch threshold may vary proportionally to the gradient. The gradient may be determined using the techniques disclosed above.

The vehicle 100 is in an off-road driving mode such as rock crawl or mud/ruts/sand, and may need quick bursts of low-mid torque from a standstill, to move a short distance. The parameter may be from a driving mode selector HMI control or equivalent.

The vehicle 100 is in a sports or racing driving mode such as dynamic, in which greater responsiveness is desirable. The parameter may be from a driving mode selector HMI control or equivalent.

The vehicle 100 is towing, which reduces acceleration. The parameter may be from a tow mode selector HMI control, or from a sensor configured to detect towing/hitching.

Any other relevant user setting is changed, such as by a dedicated HMI control for changing the pre-launch threshold.

In the above situations, the pre-launch threshold should be higher. Similarly, a higher rate of increase of torque generation between t3 and t4 may be permissible in the above situations. Notably, the situations/parameters are independent of a temperature of the traction motor 116a, 116b/inverter 114. However in some examples, the threshold is further controllable based on detected parameters by sensors such as traction motor/inverter temperature or optimum torque for a detected vehicle and/or road condition for maximum acceleration.

In further examples, the pre-launch threshold may be controllable to lower over time, since when it is first applied. The threshold may lower once or a plurality of times or continuously in proportion to the time elapsed. This provides the benefit of energy saving and additional thermal protection.

The controller 104 may be further configured to pre-emptively set cooling demand for cooling the traction motor(s) and/or inverter(s) to full or higher-than-normal. This may be performed if the entry requirement(s) for the hill-hold function are met, or when the limit is applied, or more specifically when the pre-launch threshold is reached, or at any other appropriate time.

The controller 104 (or another controller such as the ABS controller 113) may determine the torque required for holding the vehicle stationary and/or for vehicle launch. The required torque may be calculated with reference to a (or the) gradient calculation that uses the techniques disclosed above.

At time t5, the vehicle launch condition is satisfied. The satisfaction occurs at least when torque demand has increased to a value from the range 70-90%, in an example 80%, of estimated torque required for holding the vehicle stationary and/or for vehicle launch. The required torque is known based on factors, including gradient, described above in relation to the 'model' that determines the forces acting on the vehicle. The torque needed to remain stationary may be slightly less than the torque required for vehicle launch (causing the vehicle to move). The torque demand (e.g. APD) is not yet sufficient to prevent roll-back and/or move the vehicle 100. In other examples the satisfaction could occur in the range 50% to 100%. In further examples the satisfaction could occur only when the torque demand is at least sufficient for holding the vehicle 100 stationary and/or for vehicle launch, from the range 100%-150% for example. The specific value may depend on how slowly the traction motor 116a, 116b generates torque upon removal of the limit to meet torque demand, and could be predetermined.

The limit is removed at time t5 when the vehicle launch condition is satisfied. The generated torque by the traction motor 116a, 116b climbs (not instantaneously) to meet the torque demand. However, in this example but not necessarily all examples the vehicle brakes are still held so the vehicle 100 cannot move forward.

The hill-hold function is only configured to commence removing the automatic braking at time t6, when a braking removal condition is satisfied. The braking removal condition may be satisfied at least by torque demand being equal to or more than the estimated torque required for holding the vehicle stationary and/or for vehicle launch, at least 100%. Again, this estimated required torque may be known based on factors, including gradient, described above in relation to the 'model' that determines the forces acting on the vehicle.

For the braking removal condition to be satisfied, the generated torque may need to reach a predetermined amount more than the estimated torque required for vehicle launch, such as from the range 100% to 150%. In an alternative example, the torque demand rather than the generated torque may need to reach the predetermined amount, which may be applicable in examples in which the limit is still applied at the time the braking removal condition is satisfied. The vehicle launch condition is therefore satisfied before the braking removal condition is satisfied. The difference between satisfaction of the two conditions is calibrated to occur based on how much (if any) roll-back is allowed, which may be predetermined or depend on the specific gradient. Some roll-back may occur if the torque generated by the traction motor 116a, 116b following removal of the limit is rising but does not yet increase past the torque required for preventing roll-back, while the decaying hydraulic brake pressure becomes very low such that the brakes do not prevent roll-back. If some roll-back is forbidden, the vehicle launch condition may need to be satisfied well before the braking removal condition is satisfied, hence the example in which the limit is removed at 80% of required torque, and the brakes are released at above 100% of required torque. In other examples, the vehicle launch condition and braking removal condition may be the same and satisfied together.

The vehicle speed starts to rise at time t6 or shortly thereafter, once the hydraulic brake pressure has tailed off. The limit is no longer in effect and the hill-hold function is no longer active.

One or more additional strategies may be implemented during launch of the vehicle 100 at t6 to optimize the launch, described below.

For example, the controller 104 may perform one or more operations for increasing acceleration compared to if the hill-hold function was inactive. For example, torque generated and/or braking and/or a rate of clutch release (if fitted) could be controlled to reduce the risk of wheelspin. As another example, the transfer case 120 could be set to a high or low range depending on the driving mode as described above. The low range could be selected in response to a manual user input or a user setting such as rock crawl mode, or used automatically in dependence on parameters determined from the sensing means 107, such as a high road gradient parameter. The transmission 118 could be controlled in a similar way. As another example, a torque split between axles of the vehicle 100 could be controlled to maximize grip of the driven and/or steered wheels. For example, it may be desirable to distribute more torque to the axle with the highest vertical load, to optimize grip.

If the vehicle 100 has the architecture shown in FIG. 1B in which each axle 122, 124 has its own traction motor 116a, 116b, or each wheel has one, a torque split between axles of the vehicle 100 could take the form of front-biasing the torque before launch so that the front axle 122 receives more torque, then shifting torque rearward for a rear-biased or four-wheel drive launch so that the rear axle 124 receives more torque. The front-biasing is controlled to create more perceptible vehicle squat despite the limited pre-launch torque. The rearward torque shifting is to provide more traction during launch due to the load transfer to the rear. To implement this strategy, the pre-launch threshold for EM1 for the front axle 122 could be lower than the pre-launch threshold for EM2 for the rear axle 124. This strategy may be optimum for spreading the temperature increase between EM1 and EM2. Another reason for having different pre-launch thresholds and/or torque shifting between axles is that the traction motors at each axle may have different torque capabilities and/or different cooling capabilities. For example, the traction motor(s) for the rear axle may be larger than traction motor(s) for the front axle, so more relaxed limits may apply to the traction motor(s) for the rear axle, such as a higher pre-launch threshold.

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

In one example, the controller 104 determines whether the vehicle is on a gradient at least to determine whether the limit is needed. In one implementation, the ABS controller 113 also determines the gradient independently of the controller 104, to perform the other decisions disclosed herein such as whether the hill-hold entry conditions are satisfied and/or whether the vehicle launch condition is satisfied and/or whether the braking removal condition (described below) is satisfied, and sends request messages to the controller 104 to request the controller 104 to apply or remove the limit accordingly. In this example, the same control unit does not necessarily reference its own gradient estimation for all purposes including determining when to remove the limit and when to release brake pressure, but rather waits for another control unit (e.g. ABS) to request for the limit to be removed, based on that other control unit's independent gradient estimation. In some examples, the independent gradient calculations result in the same calculated gradient, but depending on implementation the different control units may determine gradient slightly differently.

Although embodiments of the present invention have been described in the preceding paragraphs with reference to various examples, it should be appreciated that modifications to the examples given can be made without departing from the scope of the invention as claimed. For example, the vehicle may be a fully autonomous vehicle. Acceleration and braking demands are always from an autonomous driving controller rather than APD and BPD.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A controller for controlling torque generated by at least one traction motor of a vehicle before a vehicle launch, the controller comprising at least one electronic processor configured to:
   determine that the vehicle is on a positive gradient;
   determine that the vehicle is prevented from roll-back by at least one vehicle brake;
   based on the determining that the vehicle is on a positive gradient and is prevented from roll-back, limit an amount of torque generated by the traction motor in response to torque demand such that the amount of torque generated by the traction motor in response to the torque demand is subject to a non-zero torque generation limit; and
   remove the torque generation limit when a vehicle launch condition is satisfied such that the amount of torque generated by the traction motor in response to the torque demand is not subject to the torque generation limit,
   the controller configured such that the torque generation is limited before either or both of an entry condition for a thermal de-rate function that de-rates the traction motor and an entry condition for a thermal de-rate function that de-rates an inverter for the traction motor above a threshold temperature is satisfied.

2. The controller as claimed in claim 1, wherein the torque generation limit inhibits an amount of torque generation by the traction motor from exceeding a pre-launch threshold.

3. The controller as claimed in claim 2, wherein the pre-launch threshold depends on at least one selected from the group consisting of: a gradient that the vehicle is on; a driving mode that is currently active; whether the vehicle is towing; a user setting; a parameter detected by a sensor; and an elapsed time period.

4. The controller as claimed in claim 2, wherein the pre-launch threshold is configured to be high enough such that either or both of the powertrain and drivetrain is pre-loaded while the generated torque is at the pre-launch threshold.

5. The controller as claimed in claim 1, wherein the limit is not applied if the determination is that the vehicle is not prevented from roll-back.

6. The controller as claimed in claim 1, configured to apply the torque generation limit while a hill-hold function is active, that applies automatic braking to hold the vehicle stationary without a need for continued manual brake pedal application.

7. The controller as claimed in claim 6, wherein the hill-hold function is configured to commence removing the automatic braking when a braking removal condition is satisfied at least by torque generated by at least the traction motor following removal of the limit, or torque demand, being equal to or more than an estimated torque required for holding the vehicle stationary and/or for vehicle launch.

8. The controller as claimed in claim 7, wherein the braking removal condition is satisfied by torque generated by at least the traction motor following removal of the limit, or torque demand, being a predetermined amount more than the estimated torque required for vehicle launch.

9. The controller as claimed in claim 7, wherein the vehicle launch condition is configured to be satisfied before the braking removal condition is satisfied, as torque demand rises.

10. The controller as claimed in claim 6, wherein the hill-hold function is active if an entry condition is satisfied, the entry condition being satisfied if at least one of the following requirements is met:
the vehicle is on a positive gradient above a positive gradient threshold;
the vehicle speed is below a threshold; and
a brake pedal of the vehicle is initially manually applied.

11. The controller as claimed in claim 1, wherein the vehicle launch condition is satisfied at least when torque demand has increased to a value from the range 70%-90% or 50%-150%, of estimated torque required for holding the vehicle stationary and/or for vehicle launch.

12. A system comprising the controller of claim 1, and at least one traction motor.

13. A vehicle comprising the system as claimed in claim 12.

14. A system as claimed in claim 12, wherein the at least one traction motor comprises a plurality of traction motors, and further wherein the limit is different for each of the traction motors.

15. A controller for controlling torque generated by at least one traction motor of a vehicle before a vehicle launch, the controller comprising at least one electronic processor configured to:
determine that the vehicle is on a positive gradient;
determine that the vehicle is prevented from roll-back by at least one vehicle brake;
based on the determining that the vehicle is on a positive gradient and is prevented from roll-back, limit an amount of torque generated by the traction motor in response to torque demand such that the amount of torque generated by the traction motor in response to the torque demand is subject to a non-zero torque generation limit; and
remove the torque generation limit when a vehicle launch condition is satisfied such that the amount of torque generated by the traction motor in response to the torque demand is not subject to the torque generation limit,
wherein the torque generation limit restricts a rate of increase of torque generation by the traction motor in response to an increase of torque demand.

16. The controller as claimed in claim 15, wherein the torque generation limit restricts the rate of increase up to the pre-launch threshold.

17. The controller as claimed in claim 15, wherein the torque generation limit inhibits an amount of torque generation by the traction motor from exceeding a pre-launch threshold.

18. A controller for controlling torque generated by at least one traction motor of a vehicle before a vehicle launch, the controller comprising at least one electronic processor configured to:
determine that the vehicle is on a positive gradient;
determine that the vehicle is prevented from roll-back by at least one vehicle brake;
based on the determining that the vehicle is on a positive gradient and is prevented from roll-back, limit an amount of torque generated by the traction motor in response to torque demand such that the amount of torque generated by the traction motor in response to the torque demand is subject to a non-zero torque generation limit; and
remove the torque generation limit when a vehicle launch condition is satisfied such that the amount of torque generated by the traction motor in response to the torque demand is not subject to the torque generation limit,
wherein the torque generation limit inhibits an amount of torque generation by the traction motor from exceeding a pre-launch threshold, and
wherein the pre-launch threshold is configured to be low enough such that thermal de-rating of the traction motor does not activate while the generated torque is at the pre-launch threshold for at least a predetermined length of time.

19. The controller as claimed in claim 17, wherein the pre-launch threshold depends on at least one selected from the group consisting of: a gradient that the vehicle is on; a driving mode that is currently active; whether the vehicle is towing; a user setting; a parameter detected by a sensor; and an elapsed time period.

20. The controller as claimed in claim 18, wherein the pre-launch threshold depends on at least one selected from the group consisting of: a gradient that the vehicle is on; a driving mode that is currently active; whether the vehicle is towing; a user setting; a parameter detected by a sensor; and an elapsed time period.

* * * * *